United States Patent [19]

Greenwood et al.

[11] Patent Number: 4,884,450
[45] Date of Patent: Dec. 5, 1989

[54] SENSOR DEVICE

[75] Inventors: John C. Greenwood, Harlow; Peter W. Graves, Dunmow; Rosamund C. Neat, London, all of Great Britain

[73] Assignee: STC PLC, London, England

[21] Appl. No.: 310,501

[22] Filed: Feb. 13, 1989

Related U.S. Application Data

[63] Continuation of Ser. No. 115,765, Nov. 2, 1987, abandoned.

[30] Foreign Application Priority Data

Nov. 3, 1986 [GB] United Kingdom ............... 8626208

[51] Int. Cl.4 .......................................... G01L 11/00
[52] U.S. Cl. ...................................................... 73/702
[58] Field of Search .............. 73/702, 704, 705, 723, 73/728, 766, 769, 773, 775, 778, 800, 862.59, 862.41, 580, 581, 579, 655, 753, DIG. 1; 356/32, 35.5; 331/155; 374/117; 338/415

[56] References Cited

U.S. PATENT DOCUMENTS

| | | | |
|---|---|---|---|
| 2,669,877 | 2/1954 | Dunlap et al. | 73/723 |
| 3,062,052 | 11/1962 | Kolb | 73/704 |
| 3,697,917 | 10/1972 | Orth et al. | 73/754 |
| 4,187,635 | 2/1980 | Deissler | 84/402 |
| 4,379,226 | 4/1983 | Sichling et al. | 73/704 |
| 4,410,871 | 10/1983 | Mallon et al. | 338/5 |
| 4,446,543 | 5/1984 | McLandrich et al. | 73/655 |
| 4,567,451 | 6/1986 | Greenwood | 73/778 |
| 4,588,886 | 5/1986 | Snider | 73/705 |
| 4,670,649 | 6/1987 | Senior et al. | 73/705 |

FOREIGN PATENT DOCUMENTS 2146120 4/1985 United Kingdom ............ 73/862.59

Primary Examiner—Robert R. Raevis
Attorney, Agent, or Firm—Lee, Mann, Smith, McWilliams & Sweeney

[57] ABSTRACT

A pressure sensor includes a resonator element (14) mounted on an optical fibre ferrule (11) whereby light signals for maintaining the resonator in a state of oscillation and for returning a modulated signal to a remote station are coupled to the resonator. The resonator is located in an evacuated cavity and is mounted on a flexible diaphragm whereby pressure changes may be detected as changes in the resonant frequency.

5 Claims, 2 Drawing Sheets

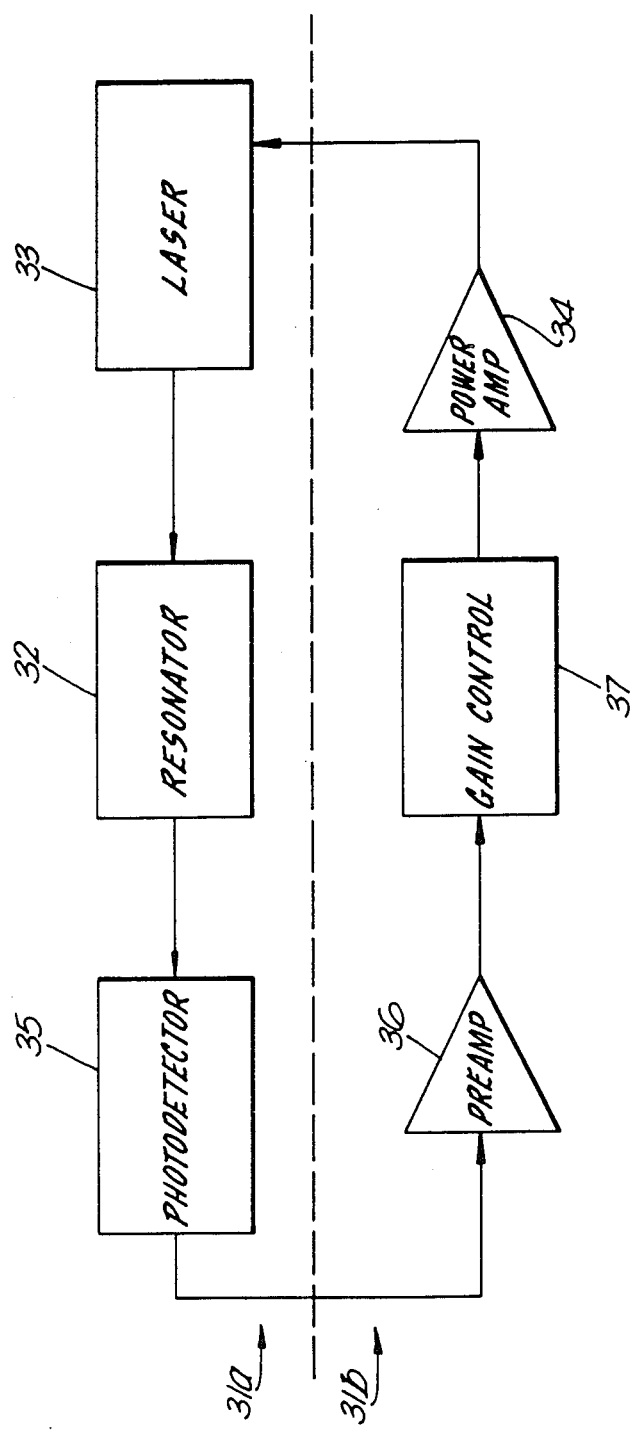

SENSOR DEVICE

This application is a continuation of application Ser. No. 115,765, filed Nov. 2, 1987, now abandoned.

This invention relates to sensor devices e.g. for well logging applications.

BACKGROUND OF THE INVENTION

Pressure sensor devices currently in use require some form of electrical connection between a sensing station and a sensor head. Whilst such sensors are satisfactory in many applications they have not found favour in environments subject to fire hazard such as are encountered in gas or oil well logging. In these applications there is great reluctance to install any system that involves electrical connections The object of the present invention is to minimise or overcome this disadvantage.

SUMMARY OF THE INVENTION

According to the invention there is provided a pressure sensor, including an optical fibre ferrule on one end of which a silicon diaphragm supported by a peripheral flange is mounted so as to define a cavity between the diaphragm and the ferrule end, and a resonator element supported on the diaphragm and responsive by variation of its resonant frequency to flexure of the diaphragm resulting from pressure applied thereto, the resonator element being in register with an optical fibre supported in the ferrule whereby, in use, the element is maintained in a state of resonance at a frequency corresponding to the applied pressure by optical signals directed on the element via the fibre.

In use, the sensor is coupled to a frequency meter whereby optical signals modulated with the resonator frequency provide a measure of pressure applied to the diaphragm.

BRIEF DESCRIPTION OF THE DRAWINGS

Embodiments of the invention will now be described with reference to the accompanying drawings in which:

FIG. 3 shows an alternative control system.

DESCRIPTION OF PREFERRED EMBODIMENT

Figure 1:
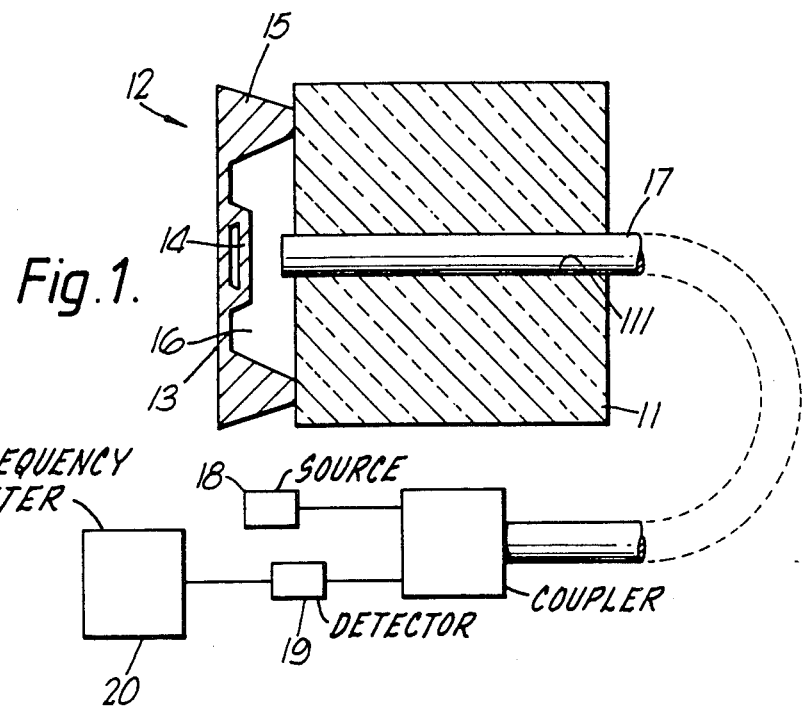
FIG. 1 is a sectional view of a pressure sensor together with its associated control system.

Referring to FIG. 1, the sensor includes an optical fibre ferrule 11 on one end of which a pressure transducer 12 is mounted. The transducer 12 has a flexible diaphragm 13 which, in use, is exposed to an external pressure. Mounted on the diaphragm 13 is a resonator element 14 the vibrational frequency of which is a function of strain applied thereto by distortion of the diaphragm.

The diaphragm 13 and resonator 14 are formed, preferably as an integral structure, by selective etching from a body of single crystal silicon. The diaphragm 13 is secured to the ferrule 11 via a peripheral flange 15, e.g. by electrostatic bonding, to define a cavity 16 in which the resonator element 14 is disposed. The cavity 16 is evacuated to minimise the viscous damping of the resonator and to provide an absolute, temperature independent, reference pressure, An optical fibre 17 e.g. a silica fibre, is mounted in the ferrule such that the fibre end is adjacent the resonator element 14 whereby optical signals may be applied to the resonator to maintain it in a state of oscillation. Techniques for driving a resonator from an optical signal are described in our copending application No. 8610253 (J. C. Greenwood 63) and in published U.S. Pat. No. 2,121,953 (J. C. Greenwood 42). In use, optical power is provided by a source 18 coupled to the fibre, and return signals modulated with the resonator frequency are fed via a detector 19 to a frequency meter 20. A pressure applied to the diaphragm 13 generates a corresponding strain in the resonator 14 thus determining its vibrational frequency.

Typically the ferrule 11 is formed from a borosilicate glass whose thermal coefficient of expansion matches that of silicon. The fibre 17 may be sealed in the central bore 111 of the ferrule by metallising the surfaces of both the fibre and the bore followed by soldering or welding of the two surfaces to provide an hermetic seal therebetween. Alternatively the ferrule may be heated to its softening point and fused to the fibre. There will be localised strain arising from the difference between the expansion coefficients of glass and silica, but this strain is compressive and does not lead to fracture of the structure. After the fibre has been secured the end face of the ferrule is polished to provide a smooth flat surface to facilitate bonding of the transducer 12.

Figure 2:
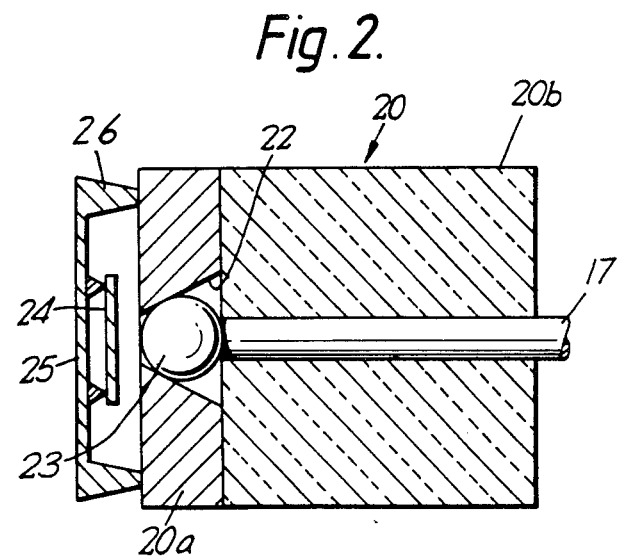
FIG. 2 shows an alternative sensor construction.

A modified sensor is shown in FIG. 2 of the accompanying drawings. In this arrangement the ferrule 20 is made in two parts one of which (20a) has a tapered opening 22 coaxial with the bore in the other ferrule part 20b and in which opening a ball lens 23 is located in register with the end of optical fibre 17 supported in the ferrule part 20b. The ferrule part 20a may be made of single crystal silicon.

The ball lens 23 provides optical coupling between the fibre end and a resonator element 24 supported on a flexible single crystal silicon diaphragm 25. As before, the diaphragm 25 has a peripheral flange 26 sealed to the ferrule part 20a so as to define a cavity in which the resonator element 24 is contained. This cavity is evacuated to provide an absolute reference pressure and to minimise damping of the resonator vibrations.

An alternative control circuit for the system is shown in FIG. 3. The circuit incrporates an optical portion 31a and an electronic portion 31b. Optical power to the resonator 32 is provided e.g. by laser 33 driven by a power amplifier 34. The modulated output from the resonator is converted into an electrical signal by photodetector 35 is then fed via a preamplifier 36 to a gain control (AGC) circuit 37. Typically the preamplifier 36 comprises a junction field effect transistor. The AGC output is then fed to the power amplifier 34 thus completing the feedback loop. To ensure oscillation of the loop resonant frequency the input and output signals to and from the resonator are in phase. This phase relationship is provided either by the amplifier or by an additional phase control circuit (not shown) in the loop.

Other techniques of driving the resonator and detaining the vibrational frequency will be apparent to those skilled in the art.

The sensors of FIGS. 1 and 2 are of particular application to hostile enviroments such as are encountered in well logging. As the sensors are purely optical in operation, i.e. there is no electrical connection thereto, there is no fire hazard involved in their use.

For well logging applications it may be of advantage to employ a pair of sensors, one of which is adapted to measure pressure whilst the other, e.g. by gas filling of the cavity, provides both a temperature and pressure response. The two sensors can then be employed to provide temperarature compensation of down-well pressure readings.

In the foregoing description, particular reference has been made to the use of the sensor devices in pressure measurement. It will be appreciated however that, by suitable adaptation, other variables such as stress or temperature can also be measured by this technique.

We claim:

1. A remote pressure sensor comprising a self-contained assembly, and including a generally cylindrical optical fibre ferrule formed from a borosilicate glass and on one end of which a single crystal silicon structure incorporating a pressure responsive diaphragm is mounted and secured thereto, the single crystal silicon structure defining an air-tight cavity between the diaphragm and the ferrule end, said cavity being evacuated so as to provide an absolute pressure reference and a single crystal silicon resonator element integral with and extending from the diaphragm into the cavity and responsive by variation of its resonant frequency to flexure of the diaphragm resulting from pressure applied thereto, the resonator element being disposed in register with and directly optically coupled to an optical fibre supported and permanently secured, in alignment with the resonator element, over a significant length adjacent its end in the ferrule whereby to provide means for maintaining the resonator element in a state of resonance at a resonant frequency, corresponding to the applied pressure, by an input optical signal, derived from feedback means and modulated with the resonant frequency, directed on to the resonator element via the fibre, said fibre further providing means for transmitting from the resonator element an output optical signal modulated with the resonator frequency corresponding to the applied pressure.

2. A pressure sensor as claimed in claim 1, wherein the diaphragm is bonded electrostatically to the ferrule end.

3. A pressure sensor as claimed in claim 1, wherein a ball lens is provided between the optical fibre and the resonator element so as to provide optical coupling therebetween.

4. A sensor system incorporating a sensor as claimed in claim 1.

5. A remote pressure sensor as claimed in claim 1, wherein the optical fibre is retained in the ferrule by compressive strain exerted by the ferrule on the fiber.

* * * * *